Oct. 10, 1944.  D. W. TACKETT  2,359,947
SCORING MECHANISM FOR EDIBLE NUTS
Filed May 26, 1941  3 Sheets-Sheet 1

Dee W. Tackett
INVENTOR

BY
ATTORNEY

Oct. 10, 1944.　　　D. W. TACKETT　　　2,359,947
SCORING MECHANISM FOR EDIBLE NUTS
Filed May 26, 1941　　　3 Sheets-Sheet 2
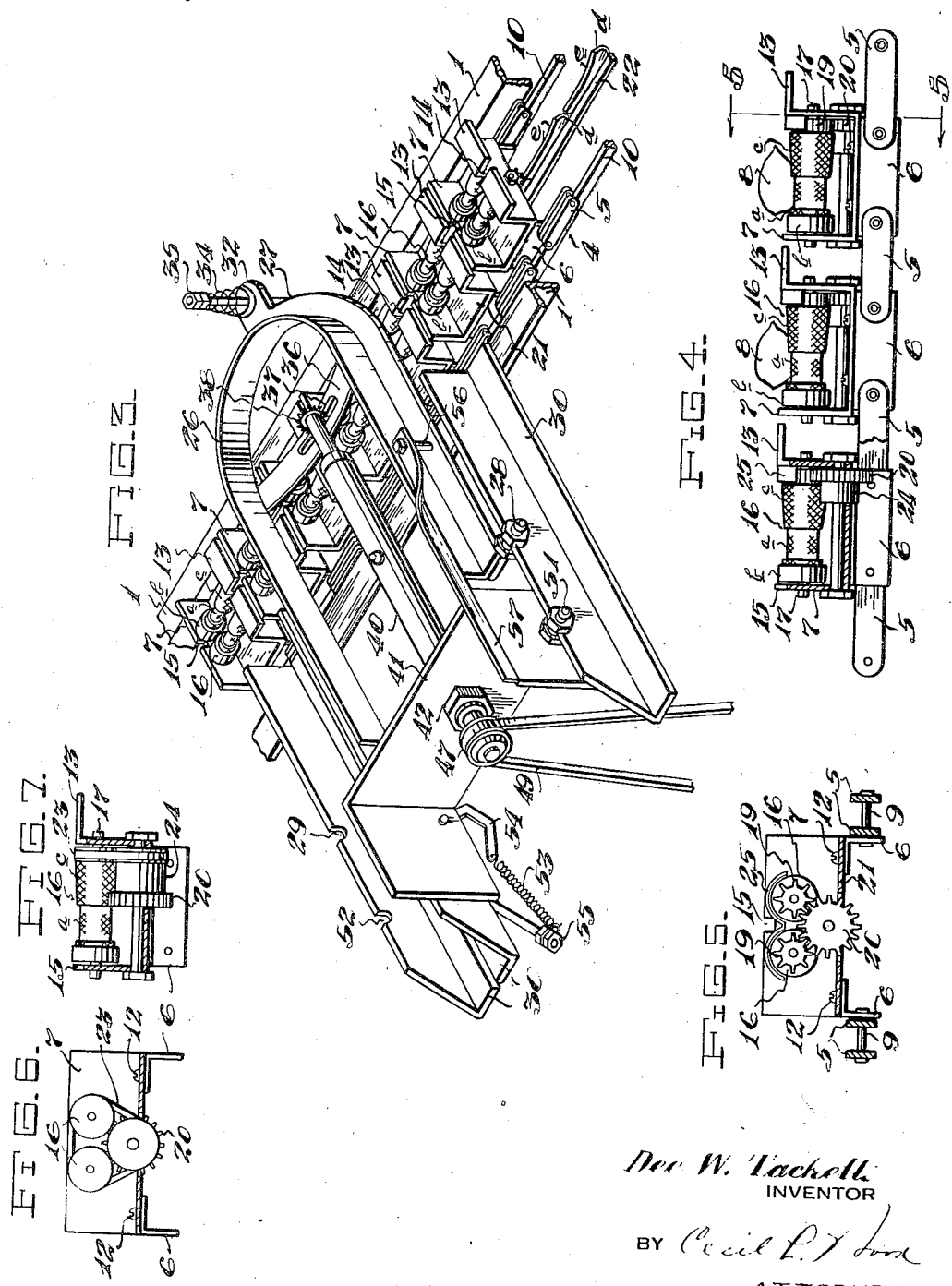
Dee W. Tackett
INVENTOR
BY Cecil L. Food
ATTORNEY Oct. 10, 1944.          D. W. TACKETT          2,359,947
             SCORING MECHANISM FOR EDIBLE NUTS
             Filed May 26, 1941        3 Sheets-Sheet 3
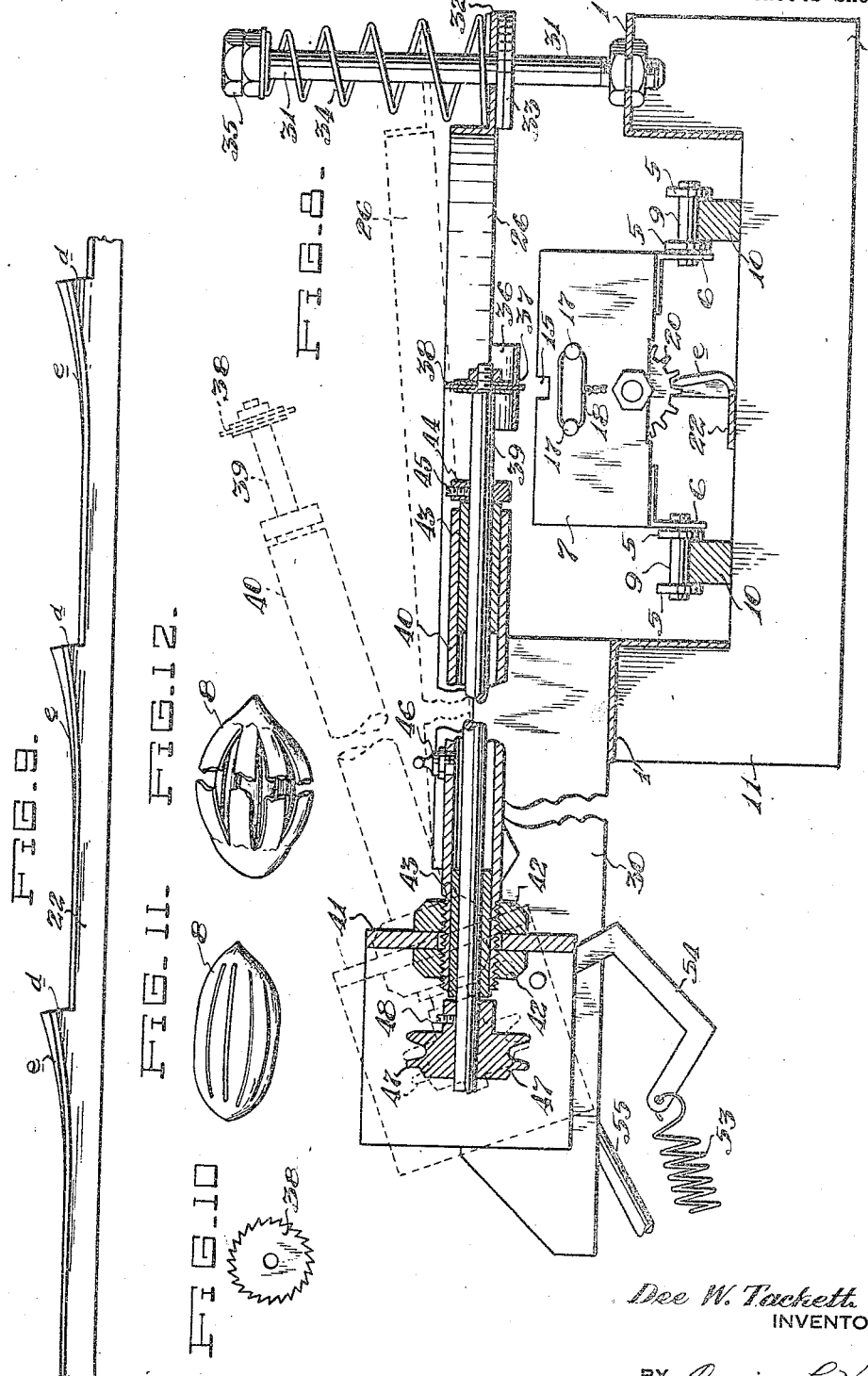
Dee W. Tackett
INVENTOR
BY
ATTORNEY Patented Oct. 10, 1944

2,359,947

UNITED STATES PATENT OFFICE 2,359,947

SCORING MECHANISM FOR EDIBLE NUTS

Dee W. Tackett, Fort Worth, Tex.

Application May 26, 1941, Serial No. 395,194

1 Claim. (Cl. 146—10)

This invention relates to scoring devices and it has particular reference to a machine for scoring the shells of nuts, such as pecans, and the like, preparatory to cracking and removing the meat therefrom, and its principal object resides in the provision of a combination of elements adapted to subject the nuts processed therein each to independent scoring operations applied, preferably longitudinally of the nut, in such a manner as to weaken the shell to insure the cracking thereof and its separation to free the nut meats in as whole condition as possible, thereby producing a more desirable and valuable product.

Another object of the invention resides in the provision of a mechanism embodying elements affording rotative movement of the nut as the same progresses along its course through the device enabling the scoring operations to be applied at several points around the longitudinal axis of the nut to provide substantial uniformity in marking the shell to insure uniform separation thereof under the pressure of the cracking operation to be applied by other mechanism.

An important object of the invention is that of providing a plurality of scoring assemblies arranged in battery formation and independently driven so that each nut coming in contact therewith will be subjected to a scoring operation, thus insuring a plurality of such operations on each nut in its course through the mechanism. A further object of the invention is that of providing a sufficient number of the scoring assemblies to adequately indent the shell of each nut, regardless of its size, to cause the shell to be parted, under the normal pressure of the cracking apparatus, and yield up the meat with the minimum of breakage.

Broadly, the invention seeks to comprehend the provision of a mechanism, combined with a feeding machine, capable of conducting hard shelled nuts through a series of scoring operations by which the shells are intended and thus prepared for uniform cracking, and to conduct such nuts through said mechanism on independent carriages, each adapted to automatically partially rotate each nut after each scoring operation, in its progress through the mechanism, and deposit such nut individually into a receptacle capable of retaining the same until subsequently subjected to further operations.

While the foregoing objects are paramount, other and lesser objects will become manifest as the description proceeds, taken in connection with the appended drawings wherein:

Figure 3 is an isometric view of one of the scoring assemblies showing the main frame structure of the invention and the conveyor only fragmentarily, and illustrating the various adjustments of the device as well as the unique arrangement for turning the nut in its progress through the device.

Figure 4 is a fragmentary illustration of the conveyor structure, illustrating in detail the carriage assembly and showing the driving mechanism for the nut rotating mechanism.

Figure 5 is a view taken on lines 5—5 of Figure 4 illustrating the gear arrangement for the turning mechanism and depicts, in cross section, the link arrangement by which the carriages are connected.

Figure 6 shows a modified form of the driving arrangement for the turning mechanism and illustrates, from one end, the relationship of the supporting knurled rollers, shown in Figures 3 and 4, the end of the carriage being removed.

Figure 7 is a view of a modified form of the carriage assembly, illustrated in Figure 6, showing the carriage cradle in longitudinal cross section.

Figure 8 illustrates the scoring assembly in longitudinal cross section and depicts the variable positions of the frame and the rotating element in dotted lines, and illustrates one end of one of the carriages and the rotating means for the turning mechanism therebeneath.

Figure 9 illustrates, fragmentarily, the rail, having outwardly curved sections, for partially rotating the turning mechanism of the carriages, illustrated in position in Figure 8.

Figure 10 depicts, in elevation, the serrated disc which performs the scoring operation, and Figures 11 and 12 illustrate the scored nut and the fractured shell after the cracking operation performed by a conventional cracking machine.

It is commonly the practice to subject each nut to a cracking operation in a machine designed for the purpose in its original state, without scoring or indenting the shell to insure uniform fracture thereof. The practice, however, is unsatisfactory in that a great percentage of the nuts are crushed in such a manner as to free the meats therefrom in pieces, rather than in whole parts, rendering the product less desirable and incapable of commanding the maximum market price for the more desirable whole meats. Moreover, the shell is easier removed from the meat when fractured uniformly and production is accordingly increased with considerable less hazard to the quality thereof.

It is also an important factor that the meat can be removed from the shell in greater quantities over lesser periods of time and with a minimum of contact with the human hands, thus affording a more sanitary method of separating the meat from the shell.

Figure 1:
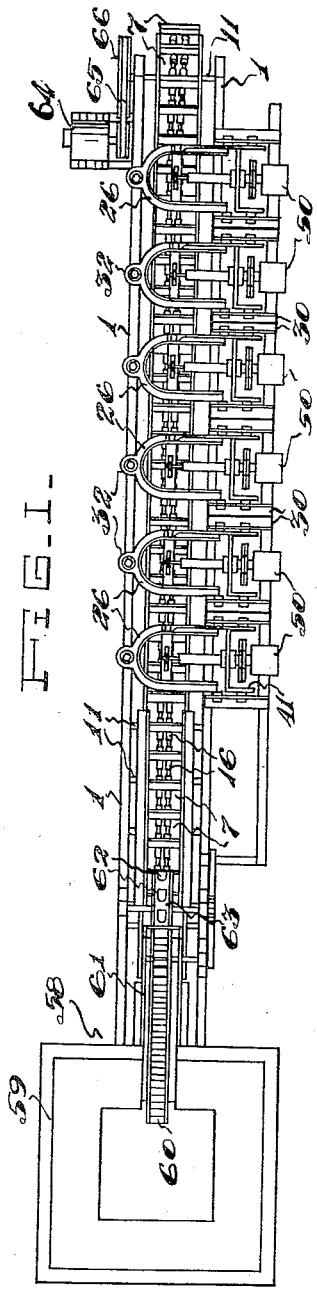
Figure 1 is a plan view of the machine illustrating the plurality of scoring mechanisms arranged in parallel relationship longitudinally of the invention.
Figure 2:
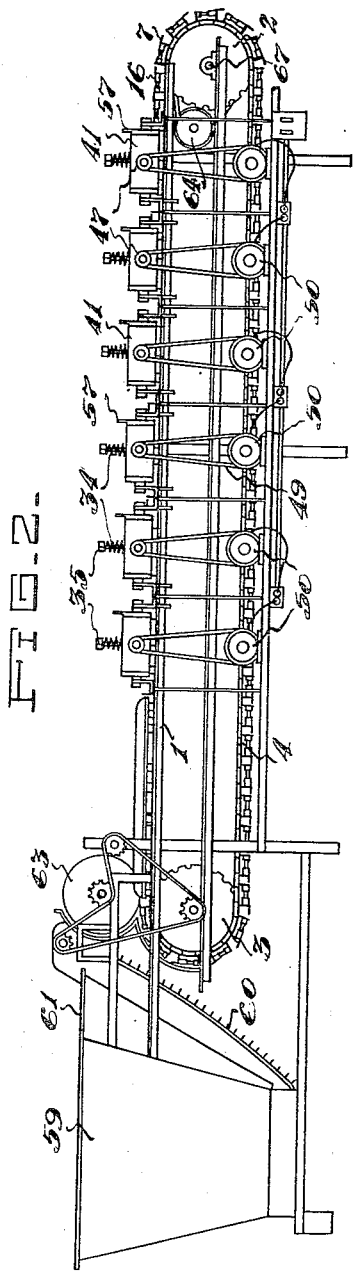
Figure 2 is a front elevational view of the invention showing the arrangement of the conveyor, the feeding mechanism and the independent driving means for each of the scoring assemblies.

Accordingly, therefore, the invention is comprised primarily of a main frame structure 1, illustrated more in detail in Figures 1 and 2, in each end of which are mounted sprocket assemblies 2 and 3 over which a conveyor chain 4 comprising spaced parallel links 5, illustrated in Figures 3, 4 and 5, secured to the depending angular members 6 of cradles 7 forming individual carriages for the nuts 8, illustrated in Figures 4, 11 and 12, the linked members 7 forming a continuous chain hereinafter referred to as the conveyor chain.

The links 5 are spaced, as illustrated in Figure 5, by rigid pins 9 adapted to engage the upper edge of parallel rails 10, shown in Figure 3, the lower edges of the links 5 affording flanges which engage each side of the rails 10 and serve to guide the assembly along the latter and over the sprockets 2 and 3 which are paired and arranged parallel, or face to face. The rails 10 are supported on the frame 1 at intervals by a substantially U-shaped bracket 11, illustrated in Figure 8. The angular depending members 6 of the carriages 7 are secured to the latter by screws 12, or the like, as illustrated in Figures 5 and 6.

Each of the cradles 7, shown particularly in Figures 3 to 7, inclusive, are formed with a slotted integral horizontal flange 13 at their forward ends which substantially enclose the space between the members, as illustrated in Figure 4, and prevent the nut, or other matter, from falling between these members yet enabling the revolving cutting element, hereinafter referred to, to extend into the slot 14 formed in the center. The opposite ends of the cradles 7 are also centrally notched at 15, as indicated particularly in Figure 5, to accommodate the said cutting element.

Each of the carriages, which primarily consist of the cradles 7, includes an arrangement of paired knurled rollers 16, shown in detail in Figures 4 and 7, and are formed with a reduced portion $a$ intermediate its ends, one of which, designated $b$, is of greater diameter, and the other end $c$ is formed conical which, when arranged parallel to its mate on the opposite roller 16, provides a receptacle for the nut 8 while the knurling on the portions $a$ and $c$ insures a positive contact with the nut aiding in the rotation thereof as the rollers 16 are rotated in a manner which will be hereinafter described.

The knurled rollers 16 are journalled in the cradles 7 so that their longitudinal axes are parallel, as illustrated in Figure 3, by pins 17 keyed at their ends by a length of wire 18, or similar device, as illustrated in Figure 8. Due to their form, the rollers, when positioned parallel, afford a saddle for the nuts 8 which repose in the space between the restricted portions $a$ and the knurling on these portions, as well as the conical portions $c$, aids in permitting the nuts to be turned partially at intervals during their progress along the main frame structure 1 as it is moved by the conveyor assembly.

Each of the rollers 16 may be formed with an integral gear on one end, as illustrated in Figures 4 and 5, adapted to mesh with another gear 20 therebelow journalled through the ends of each of the cradles 7 and depending partially below the floor 21 thereof. This arrangement is depicted in Figure 8. The gear 20 engages a track or rail 22, shown in detail in Figures 8 and 9, which is severed at $d$ at intervals along its length and the severed ends curved outwardly a distance equal to the space between the teeth of the gear 20 so that as the gear travels along the curved portions of the track it is rotated slightly and, if a sufficient number of the curved portions $e$ of the track are provided, the gear 20 can make a complete revolution each time the entire length of the track 22 is traversed.

Another method of driving the rollers 16 is illustrated in Figures 6 and 7 and consists of a belt and pulley assembly rather than the gears shown in Figures 4 and 5. The arrangement of the rollers 16 is identical with that of the structure illustrated in Figures 4 and 5 but instead of the integral gears 19 the rollers are provided with belt grooves in which a belt 23 is arranged. The gear 20 is reversed and a groove is provided on the integral boss 24 thereof, as shown in Figure 7, in which the belt 23 is engaged. In some instances the belt drive arrangement shown in Figures 6 and 7 is preferable to the gear assembly, shown in Figures 4 and 5, due to the fact that shell particles and other matter may drop into the gear assembly 19 and 20 impairing the operation of the device. However, shields 25 are arranged above the gears 19, as shown in Figures 4 and 5, which minimize such difficulties.

The main frame structure consists primarily of a pair of angle bars 1, illustrated in Figures 3 and 8, arranged parallel and coupled, at intervals, with the substantially U-shaped member 11, previously described, and which latter supports the rails 10 and 22, as illustrated in Figure 8. The parallel members of the frame also serve to support the scoring assembly, one of which is illustrated in detail in Figure 3, in a manner which will be presently described.

The scoring assemblies are preferably arranged in multiples, as illustrated in Figures 1 and 2, and consist primarily of substantially U-shaped members 26 formed with a horizntal flange 27 extending all the way around the structure so that the members 26 are angular in cross section as illustrated in Figure 8. Each leg of the members 26 is pivoted at 28, preferably through the medium of a bolt adapted to repose in slots 29 formed in the upper edge of angle brackets 30 supported by the frame 1, as illustrated in Figure 3. The members 26 are arranged at right angles to the direction of movement of the conveyor assembly and are yieldably anchored at their forward ends to the frame 1 through the medium of bolts 31 arranged through apertured integral projections 32 and are urged downwardly against integral washers 33 fixed to the bolts 31 by tension springs 34 in the manner illustrated in Figure 8, the tension of which may be adjusted through the medium of the nuts 35 threaded to the tops of the bolts 31, illustrated in detail in Figure 8.

Near the forward end of the members 26 a shoe 36 is rigidly secured transversely thereof, as illustrated in Figures 3 and 8, and is curved downwardly and provided with a central slot 37 designed to accomodate the rotating serrated scoring discs 38, illustrated in detail in Figure 10. The members 38 are fixed to the ends of shafts 39 arranged parallel to the leg members of the U-shaped frames 26 and are provided with cylindrical housings 40 fixed at one end to pivoted brackets 41 through the medium of nuts 42, in the manner illustrated in Figure 8. Bearings 43 are arranged in each end of the housings 40 for the shafts 39 and the latter are retained against longitudinal movement in the housings 40 by adjustable collars 44 fixed by set screws 45, as shown in Figure 8. Suitable lubricating fixtures 46 are provided for the shafts 39.

As the shafts 39 project through the brackets 41, pulleys 47 are secured thereto and retained on the shafts by set screws 48. Belts 49 are arranged over the pulleys 47 for driving the shafts 39 and the scoring discs 38 by motors 50, illustrated in Figures 1 and 2. It will be noted that each of the scoring assemblies is independently driven, which is a desirable arrangement, in order to avoid shutting down the machine if difficulties are encountered with individual assemblies. The brackets 41 are also pivoted to the angle brackets 30 in a manner similar to the pivots 28 of the members 26. The brackets 41 are also provided with pivots 51 adapted to engage notches 52 in the upper edges of the brackets 30 to permit yieldability of the scoring elements 38 as these members contact the nuts 8 as the latter pass along thereunder in the carriages.

The members 26 are not only made yieldable through the medium of tension springs 34 but, by removing the nuts 35 and the springs 34, these members may be raised on their pivots 28 in the manner illustrated in dotted lines in Figure 8. As the nuts 8 pass under the shoes 36 the members 26 yield upwardly against the tension of the springs 34 which in turn urge the members 26 downwardly again and normally retain the members 36 in the position illustrated in Figure 8.

When it is desirable to change the scoring discs 38 on the end of the shafts 39, the belt 49 may be removed and the shafts 39 in their housings 40 raised upwardly, the brackets 41 pivoting at 51, as illustrated in dotted lines in Figure 8. The scoring discs 38 are retained in normal operating position against the work by springs 53 connected with rigid arms 54 secured to one side of each of the brackets 41, and to rods 55 attached to each of the angle members 30, as illustrated in Figure 3. The tension of the springs 53 is exerted downwardly against the forward portion of the brackets 41 and thus provides a yieldable retaining device similar to the arrangement afforded by the tension springs 34 and the nuts 35 of the members 36. The springs 53 and the arms 54 are also illustrated in Figure 8.

The operative relationship of the scoring discs 38, the shafts 39 and the housings 40, with the members 26 is regulated through the medium of set screws 56 arranged through integral arms 57 attached to the tops of the brackets 41, as illustrated in Figure 3, so that by threading the set screws 56 upwardly or downwardly the scoring discs 38 will extend a greater or less distance through the slots 37 in the shoes 36. Such an adjustment is desirable due to varying sized nuts which may be processed through the machine.

The invention is designed to be operated in conjunction with a feeding mechanism 58 which may be conventional in design, and consists of a hopper 59 into which a conveyor 60 is extended and operates within a chute 61 carrying the nuts 8 upwardly and depositing the same in the spaced receptacles 62 in the face of a distributing drum 63 rotating above the conveyor assembly, as illustrated in Figures 1 and 2. The receptacles 62 in the face of the drum 63 are spaced so that a nut can be deposited on each of the carriage assemblies 7 as these members are brought into registration with the said receptacles in the operation of the invention. The conveyor assembly, comprising the linked members 7, is driven by a motor 64 through a belt 65 and a pulley 66 secured to the shaft 67 upon which the sprocket assembly 2 is mounted.

The nuts 8 are conveyed along the machine, in the manner previously described, freely resting upon the supporting rollers 16, in tandem formation beneath the battery of scoring assemblies, each carriage being operated by the gear 20 and the track 22, to turn the nut 8 disposed thereon at intervals during its progress through the machine and beneath each of the scoring discs 38 so that the shell is subjected to a plurality of scoring operations applied longitudinally thereof so that the nut will appear in the manner illustrated in Figure 11. The product shown in Figure 12 will result after the nut has been subjected to the cracking operation.

Although the invention has been described with great particularity, it is contemplated that such changes and modifications that may be resorted to by persons skilled in the art as may be considered as falling within the spirit and intent of the invention may also be considered as falling within the scope of the appended claim.

What is claimed is:

In a scoring machine for nuts, the combination with a feeding mechanism, a frame structure having a conveyor chain movably supported thereby, a plurality of spaced carriages, secured to the said chain each adapted to individually support a nut thereon, and each having a pair of spaced parallel rotating rollers arranged in side by side relation for turning the said nut, means comprising a rail secured on the said frame and having spaced straight and curved portions for operating the said rollers progressively intermittently, a series of revolving cutting elements spaced along the said frame above the path of the nuts and operable to score the nuts longitudinally during the periods of rest of the rollers as said rollers move over the straight portions of said track.

DEE W. TACKETT.